May 28, 1957 R. F. RIES ET AL 2,793,827
AMPHIBIOUS AIRCRAFT AND ELEMENTS THEREOF
Original Filed Nov. 18, 1949 6 Sheets-Sheet 2

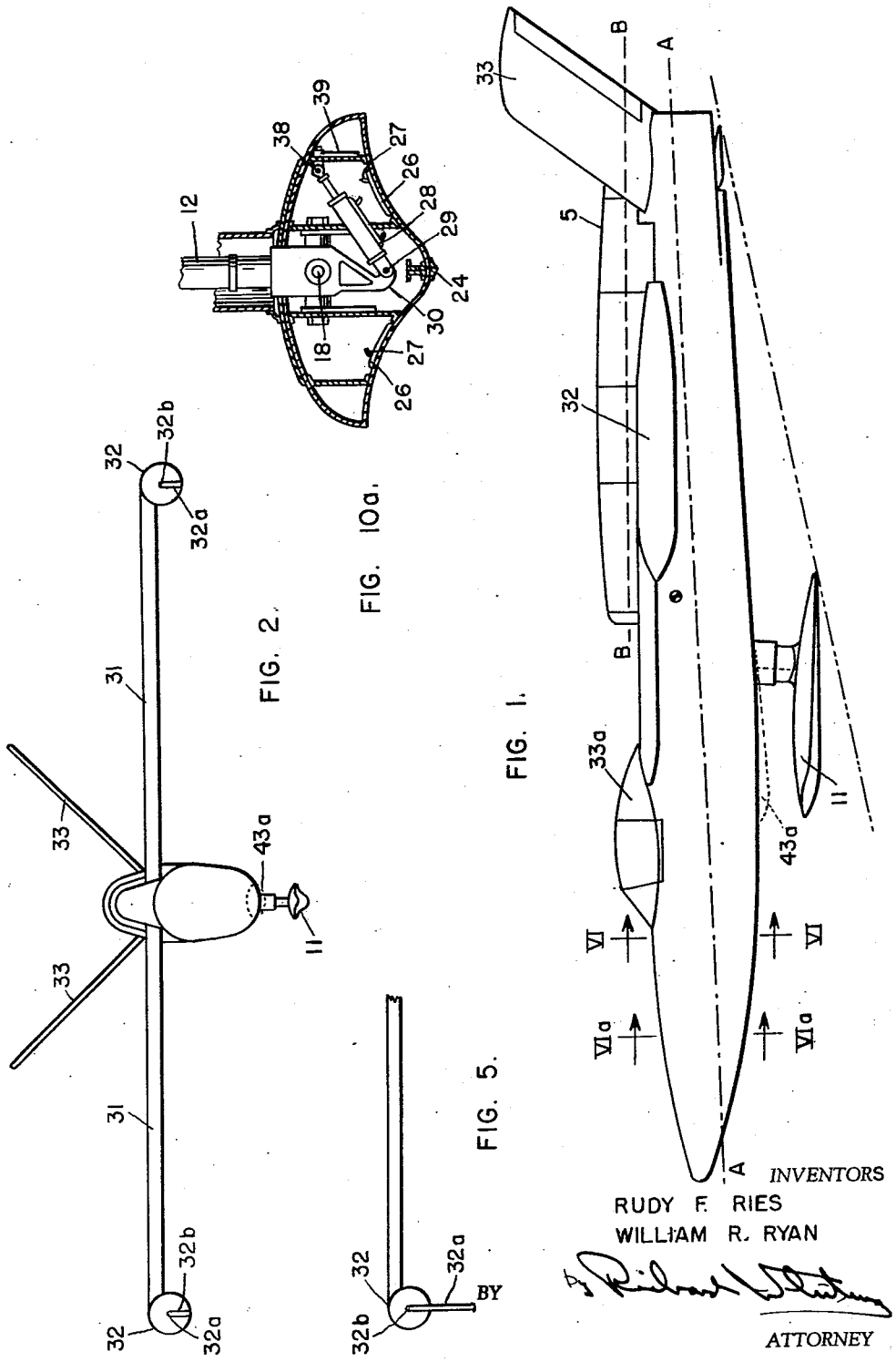

INVENTORS
RUDY F. RIES
WILLIAM R. RYAN
BY
ATTORNEY

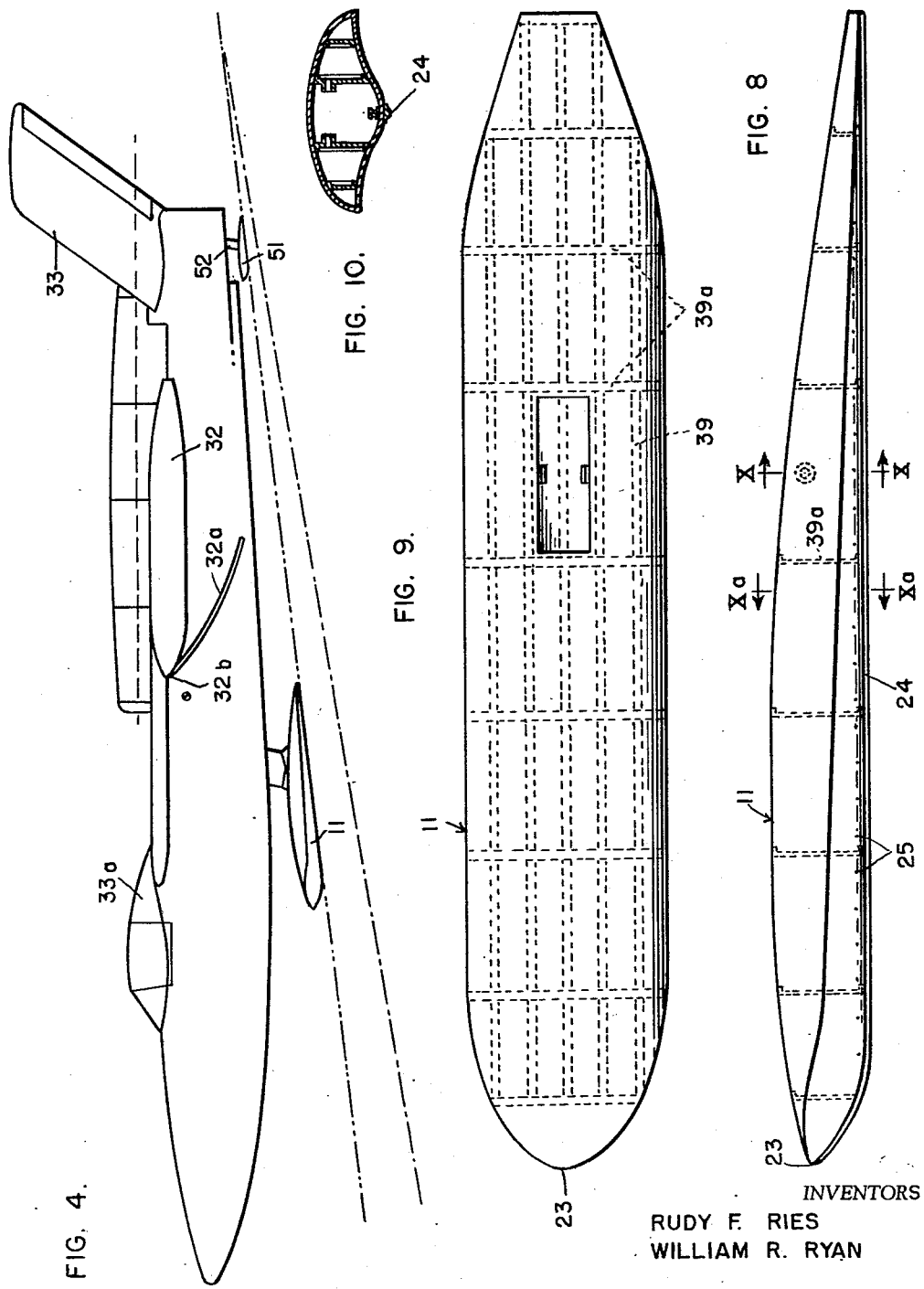

May 28, 1957 R. F. RIES ET AL 2,793,827
AMPHIBIOUS AIRCRAFT AND ELEMENTS THEREOF
Original Filed Nov. 18, 1949 6 Sheets-Sheet 5

INVENTORS
RUDY F. RIES
WILLIAM R. RYAN

ATTORNEY

May 28, 1957   R. F. RIES ET AL   2,793,827
AMPHIBIOUS AIRCRAFT AND ELEMENTS THEREOF
Original Filed Nov. 18, 1949   6 Sheets-Sheet 6

INVENTORS
RUDY F. RIES
WILLIAM R. RYAN
BY
ATTORNEY

United States Patent Office 2,793,827
Patented May 28, 1957

2,793,827

AMPHIBIOUS AIRCRAFT AND ELEMENTS THEREOF

Rudy F. Ries, Beechhurst, N. Y., and William R. Ryan, Riverside, Conn., assignors to Edo Corporation, College Point, N. Y., a corporation of New York Original application November 18, 1949, Serial No. 128,206, now Patent No. 2,692,740, dated October 26, 1954. Divided and this application November 8, 1951, Serial No. 261,846

8 Claims. (Cl. 244—108)

This invention relates to amphibious aircraft capable of landing on and taking off from sod, water, snow, ice, mud and other slippery surfaces. This application is a division of our co-pending application Ser. No. 128,206, filed Nov. 18, 1949, now U. S. Patent No. 2,692,740.

It is an object of this invention to provide an element, hereinafter referred to as a hydro-ski, which, when employed on aircraft having a fuselage or similar displacement body or bodies adapted to float in water, will serve to reduce take-off time by stabilized hydrofoil and hydroplaning action, and which means may alternately serve as skis to enable the aircraft to be operated on snow, ice, mud and other slippery surfaces. These means may also be employed to improve the hydrofoil and hydroplaning action of other water craft which are not designed to rise completely out of the water and into the air.

It is also an object to provide special means for extending the hydro-ski below the aircraft fuselage during take-off and landing in water, and for retracting the hydro-ski during flight.

It is also an object of this invention to provide means to facilitate the take-off of an aircraft from ice and snow surfaces, and its operation thereon.

As a hydrofoil and hydroplaning surface, our landing element provides excellent longitudinal stability. It is also designed to produce minimum water spray during water landings and take-offs. As a snow or ice ski, the contours of the element are so designed that it may be easily rocked loose from ice and snow surfaces. The ability to be rocked laterally is made possible by a novel tandem arrangement of the skis. This may be supplemented by the incorporation in our landing element of a rocking jack, and by providing de-icing means within the hydro-ski.

A further object of this invention is an airplane utilizing to best advantage the aforesaid means. In this connection, this invention, being particularly adapted to jet propelled aircraft, provides certain improvements in the structure of the airplane itself which render the latter particularly suited to withstand landing shocks incident to operation on water, snow and ice. It is a further object to construct the aircraft, utilizing these structural improvements, in such a manner as to simplify the installation and servicing of equipment, controls and wiring.

The aircraft for which our landing element is specifically adapted is constructed about two pairs of longitudinal structural members which give improved rigidity to the fuselage and render it particularly suited to withstand shocks incident to hydro-ski landings on water, snow, ice and mud.

Other objects will be apparent from a reading of the following description of our invention.

In the drawings:

Fig. 1 is a side elevation of an aircraft, according to our invention, in readiness for operation from water.

Fig. 2 is a front elevation of the aircraft shown in Fig. 1.

Fig. 4 is a side elevation similar to Fig. 1 showing the aircraft, with our invention, in position for landing on ice and snow.

Fig. 5 is a front elevation of the left wing of the aircraft shown in Fig. 4.

Fig. 8 is an enlarged elevation of the hydro-ski proper showing structural details.

Fig. 9 is a plan view of the hydro-ski proper.

Fig. 10 is a section on the line X—X of Fig. 8.

Fig. 10a is an enlarged detail partly in section on the line Xa—Xa of Fig. 8 showing also the shock strut and rocking jack and manner of attaching the same to the hydro-ski.

Figure 11B:
Figure 11E:
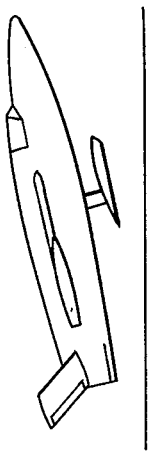
Figure 11G:
Figure 11A:
Figure 11D:
Figure 11F:
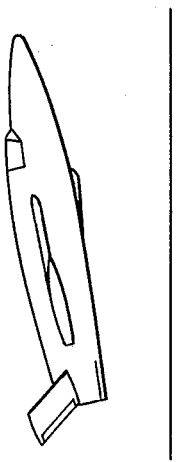
Figure 11:

Figs. 11, 11a, b, c, d, e, f are diagrammatic views illustrating the operation in and from water of an aircraft equipped with our novel hydro-ski; Fig. 11g is a detail of Fig. 11a showing particularly the manner in which the well provides lift by its angle of attack with respect to the water.

Figure 12:
Figure 12:
Figure 12:
Figure 12:
Figure 12:
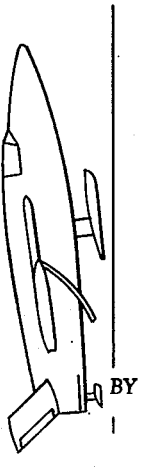

Figs. 12, 12a, b, c, d diagrammatically illustrate operation of a hydro-ski equipped aircraft on and from a hard surface such as ice or snow.

Figure 6:
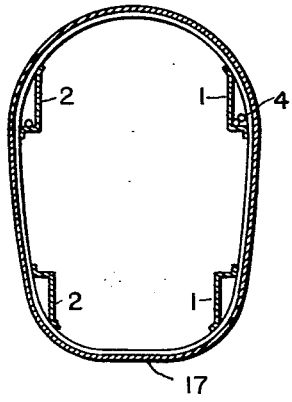
Fig. 6 is a detailed section taken on the lines VI—VI of Fig. 1.
Figure 6A:
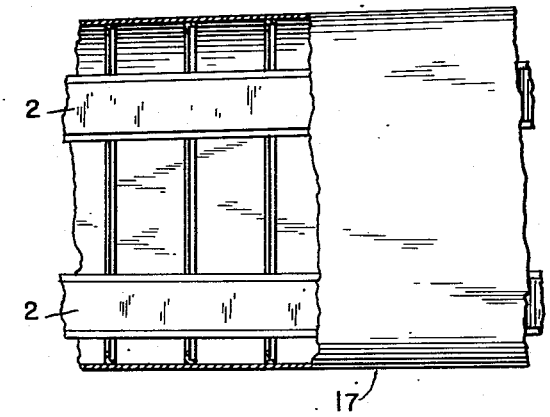
Fig. 6a is a detail partially broken away of the fuselage taken between the lines VI—VI and VIa—VIa of Fig. 1.
Figure 1A:
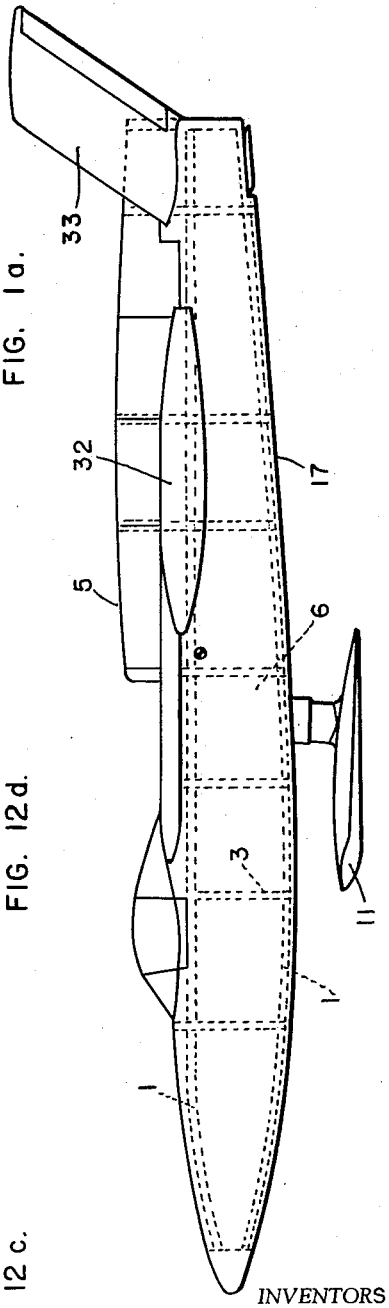
Fig. 1a is a similar view showing the location of the internal structural members.

Referring to Figs. 1a, 6 and 6a, the airframe is basically constructed about the two pairs of longitudinal members 1, 2 which extend from the nose to the tail of the fuselage. These members 1, 2 are firmly joined to transverse vertical watertight bulkheads 3 (Figs. 1a, 7) placed at seceral intervals in the fuselage. The longitudinal members 1, 2 may be of any desired cross-sectional shape suitable for use as a channel or conduit, in which may be placed controls, piping, cables and electrical wiring 4 (Fig. 6). Within the after half of the airplane and between and just above the upper pair of members 1, 2 is installed a turbo-jet power plant 5. The members 1, 2 are specially suited to support the jet power plant 5 and to conduct the controls, piping, cables and wiring 4 to and from that unit.

Figure 7:
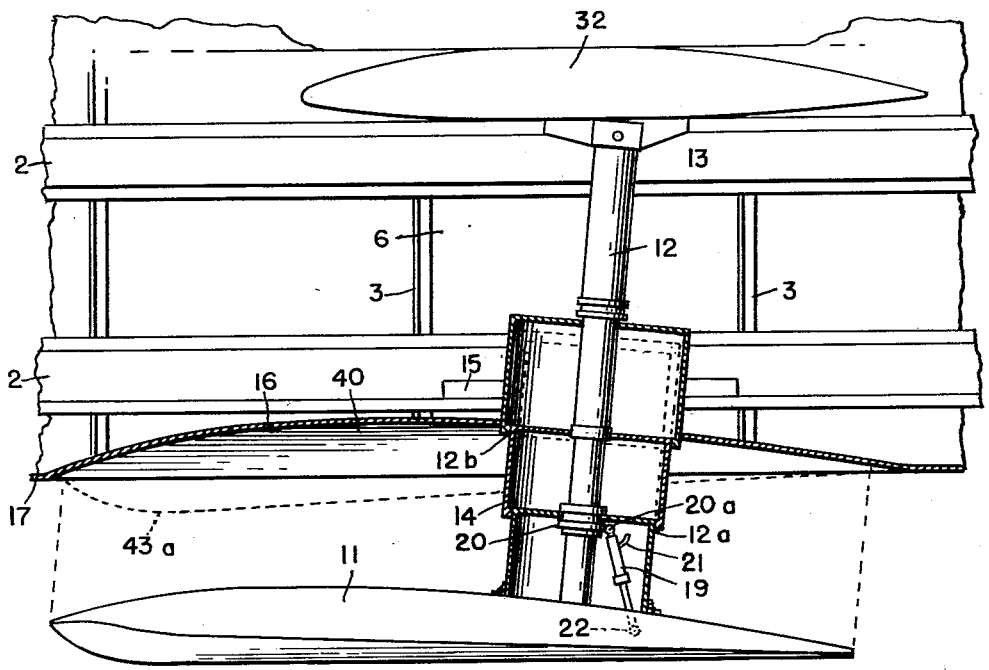
Fig. 7 is an enlarged side elevation partly in section of the hydro-ski and associated apparatus, including immediate fuselage structure by which the hydro-ski is supported.

In the central area of the aircraft, the two pairs of longitudinal members 1, 2, and the vertical bulkheads 3 shown in Fig. 7 serve to provide a specially reenforced area, 6, within which may be secured the mounting arrangement for the hydro-ski 11 consisting of the shock strut 12, its main trunnion 13 connected between the top pair of longitudinal members 1, 2, the telescoping faired housing 14, the lower support frame 15 through which the latter projects and to which it is secured, and the well skin 16 also surrounding the telescopic housing 14.

The entire fuselage 17 of the aircraft is a watertight displacement body divided by the watertight vertical bulkheads 3 described above.

Figure 3:
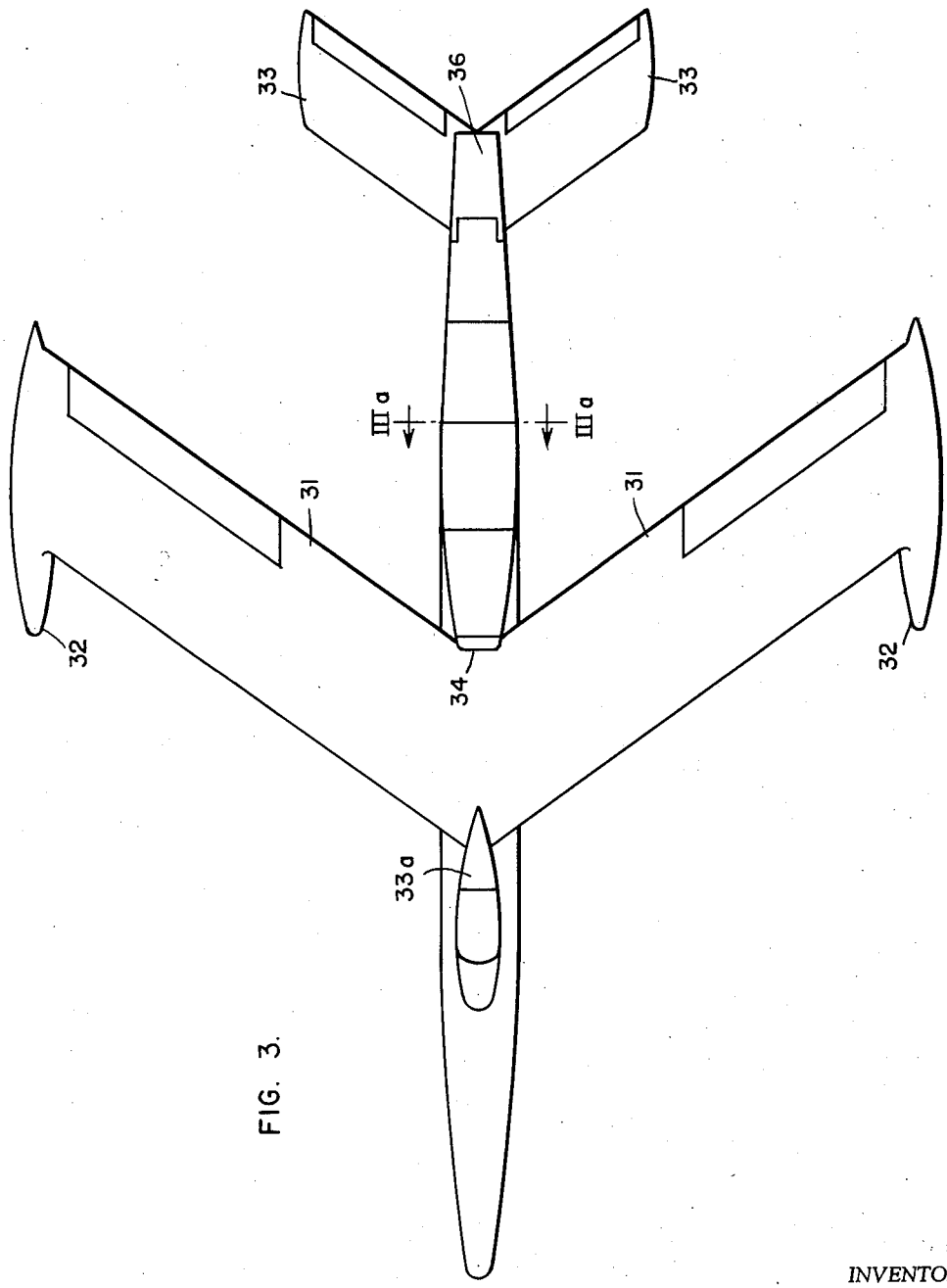
Fig. 3 is a plan view thereof.

As may be seen from Fig. 3, the aircraft is provided with swept-back wings 31 at the tip of which are streamlined wingtip floats 32. Completely retractable within each of the latter is a flexible skid 32a which is secured to and is longitudinally pivotable about a point 32b, in the nose of the float 32 (see Figs. 2, 4, 5). The tail assembly 33 is likewise sweptback. The intake 34 to the turbo-jet power plant is located amidships behind the cockpit canopy 33a. The tailpipe nozzle 36 extends rearward over most of the central portion of the tail assembly.

The reenforced area 6 described above and shown in Fig. 7 is located slightly forward of the center of gravity of the aircraft. The shock strut 12 may be extended and retracted hydraulically in the manner of a telescope through openings 12a and 12b in the lower support frame 15 and the well skin 16 respectively. The faired housing 14, which is provided to reduce water drag, also collapses telescopically upon retraction of the shock strut 12, and extends with the latter when the hydro-ski 11 is to be extended. To the lower end of this shock strut 12, the hydro-ski 11 is universally pivoted at the joint 18 (Fig. 10a) and its fore-and-aft position is governed by a rigger strut 19 (Fig. 7). The rigger strut itself is secured to the shock strut 12 by the clamp 20 and pin 20a; and to the ski by a universal joint 22 therein. The rigger strut 19 may be hydraulically locked, as for water operation, by a medium supplied through inlet duct 21, or it may be released to permit the hydro-ski to pivot longitudinally about joint 18 when operated on a hard surface. It will be seen from the above that the hydraulic rigger strut 19 fulfills several functions in the operation of the hydro-ski: It serves as a shock absorber for longitudinal torque loads about the pivot 18 when the hydro-ski is used on ice and snow; it provides a means of adjusting the angle of the hydro-ski with respect to the airplane, and it acts as a locking device to firmly position the hydro-ski 11 for landings and take-offs from water. Lateral positioning of the hydro-ski is controlled by a double acting, hydraulically operated rocking jack 28 (Fig. 10a) which is pivotally secured on one end at 29 to an extension 30 of the shock strut 12, and on the other end to a pin connection 38 on one of the longitudinal reenforcing members 39 of the hydro-ski. The normal position of the hydro-ski is vertical as shown in Fig. 10a. This jack 28 provides sufficient force to tilt the ski laterally relative to the aircraft, using the ski keel as a fulcrum point. In this process the wingtip skids 32a (Figs. 4, 5) are sufficiently rigid to maintain the aircraft in a substantially level lateral position. The rocking has the effect of dislodging the ski from any frozen surface in which it may have become embedded.

This hydro-ski 11 is essentially a hydrofoil with an aspect ratio of less than 1.0. In our preferred embodiment, we have found that a hydro-ski with an aspect ratio of approximately .25 and a 20 degree deadrise angle (see Figs. 8, 9 and 10) is quite effective. By using a low aspect ratio such as this, we have found that longitudinal stability is assured. By these means, instability resulting from premature break-through is largely avoided. The speed of emergence may be controlled by adjusting the angle of trim with respect to the free water line.

Viewing this hydro-ski in cross section (Fig. 10), it will be seen that it is rounded on top and concave-convex-concave-V-shaped at the bottom. The tip 23 of the ski (Fig. 8) is designed as a sharp edge to reduce emergence spray. The hydro-ski itself should be fabricated of a rigid, light metal, with a hard, narrow keel runner 24 on the under side. In our preferred embodiment the hydro-ski 11 is braced internally by longitudinal reenforcing members 39 and cross members 39a (Figs. 8, 9) to enable it to withstand landing shocks, particularly those resulting from operation on ice and snow. The bottom surface of the hydro-ski may, if desired, be punctured with a series of small orifices 25, as shown in Fig. 8, to permit a lubricant or a de-icing fluid to be exuded therethrough. This may be accomplished by providing a manifold 26 (Fig. 10a) supplied with fluid under pressure through piping 27.

A well 40 (Fig. 7) is provided on the underside of the watertight fuselage or displacement body about the opening 12b, so that when the element 12 is retracted, the hydro-ski 11 secured thereto is drawn partially up into the fuselage. The contour of the hydro-ski bottom as described is such that when the ski is retracted, there is but a slight protrusion 43a below the normal contour of the aircraft. (See dotted lines in Figs. 1, 2 and 7.)

Below the tail assembly and just forward of the tailpipe nozzle 36, a smaller hydro-ski 51, proportionally similar to the main hydro-ski 11, is provided (Fig. 4). This tail hydro-ski 51 is likewise retractable by means of a hydraulically actuated vertical faired strut 52 located at the tail of the aircraft, and may be provided with a shock absorber strut (not shown). We have not found it necessary, however, to include a rocking jack mechanism in this smaller ski. The tail hydro-ski is also steerable by means of the normal aircraft directional controls in order to provide maneuverability on ice and snow. In addition, this arrangement provides maneuverability when the aircraft is water-borne by virtue of the rudder effect of the streamline fairing 54 covering the shock strut 52.

The operation of our invention may be described as follows:

The aircraft at rest in water floats by virtue of the displacement of its fuselage or body and the wing tip floats 32. The dot-dash line A—A in Fig. 1 represents the normal at-rest water line. (Also see the solid line in Fig. 11.) When the aircraft prepares to take off, the strut 12 and hydro-ski 11 are extended below the aircraft (Fig. 11). The rigger strut is maintained in locked position to give the hydro-ski a slight angle (about 2°) with respect to the fore-and-aft line of the aircraft wing (mean wing chord). Thrust is then developed in the jet power plant 5 along the line B—B (Fig. 1) and increased to take-off power. As the plane moves through the water, the hydro-ski serves as a hydrofoil to provide hydrodynamic lift for the aircraft, with the result illustrated in Fig. 11a. Simultaneously the well 40, which is designed to be at an essentially positive angle of attack with respect to the water, provides additional lift (Fig. 11g) until the forward end of the fuselage rises above the water (Fig. 11b).

Figure 11C:

During the transition between hydrofoiling and planing, the trim angle of the aircraft increases and its fuselage, initially acting as a displacement body, functions briefly as a planing body (Fig. 11c).

When a certain critical speed is reached, which depends upon the details of design and construction of the aircraft and of the hydro-ski, the former will completely emerge from the water. However, it is necessary to nose down the airplane slightly so as to delay the emergence of the hydro-ski until the airplane attains sufficient speed to assure required lateral control and to avoid resubmergence of the ski. We have found that normally the hydro-ski may be permitted to emerge at a speed of between 35 and 45 miles per hour. At such speed, the airplane may be permitted to emerge to the state of pure planing on the hydro-ski (Fig. 11d). Thereafter, the water-borne weight of the aircraft will be completely sustained by the planing action of the hydro-ski until the take-off speed is reached, at which time the airplane will leave the surface of the water entirely (Fig. 11e). When the airplane is air-borne, the strut 12 and hydro-ski 11 are retracted so that the fuselage of the airplane is almost uninterrupted in its contour, as stated above (Fig. 11f). During water operations, the tail ski 51 need not be utilized except as a water rudder, and the wingtip skids 32a are not employed at all.

In landing upon water, the hydro-ski 11, locked by the rigger strut 19 as during take-off, is extended and maintained rigidly at a slight angle of attack. When contact is made, the hydro-ski 11 will plane on the surface of the water, and the aircraft's speed is gradually decreased until the submergence speed is reached, whereupon the hydro-ski submerges gradually. As the aircraft slows to zero speed, the hydrofoiling action on the hydro-ski decreases and the watertight fuselage becomes a displacement body to support the aircraft on the surface of the water. In effect, this procedure is just about the reverse of the various steps illustrated in Figs. 11–11g.

Take-off from ice, snow and other slippery firm surfaces is illustrated in Figs. 12–12d. The weight of the aircraft is sustained primarily by the tandem hydro-skis 11 and 51, lateral stability being provided by the flexible wing tip skids 32a which are dropped down and locked against retraction (see Fig. 4). These skids pivot about a vertical axis. The rigger strut of the hydro-skis 11 and 51 are released so that both the latter are free to pivot or trim in order to accommodate irregularities in the snow and ice surfaces. In this condition, it will be found that the aircraft is highly maneuverable on firm slippery surfaces.

When thrust is developed for take-off, the tail is first lifted slightly as the aircraft gains momentum so that the tail ski 51 no longer touches the ground (Fig. 12a). At higher speeds this lifting of the tail is accentuated (Fig. 12b) until the aircraft becomes air-borne (Fig. 12c). As the aircraft ascends well off the ground, both hydro-skis and the wing tip skids 32a are retracted (Fig. 12d) just as in the case of water take-off (Fig. 11f).

When landing on snow, ice or other firm slippery surfaces, the hydro-ski 11, the tail ski 51 and the wing tip skids 32a are all extended. The rigger or locking strut 19 is left in released position, allowing the hydro-ski to pivot against the hydraulic restraint of the strut 19. As the snow is approached, the hydro-ski assumes a slight positive angle with respect to the thrust line under the influence of their respective rigger struts (Fig. 12c). When contact is established, the hydro-ski pivots longitudinally about the axis point 18 (Fig. 4), and changes its angular setting as the landing angle of the airplane varies with respect to the ground. The flexible wing tip skids 32a provide lateral stability and keep the aircraft on an even plane. When the skis are maintaining continuous contact with the ground surface, the friction developed will gradually bring the aircraft to a halt.

While our hydro-ski has been applied above to assist an aircraft in taking off from water, it is obvious that because of its excellent longitudinal stability, it may also be employed on high speed water craft. It is only necessary to provide some lateral stabilizing means either aerodynamic or hydrodynamic in design, various types of which will readily occur to those skilled in the art.

We claim:

1. In combination with an airplane having a single main ski landing element and a steerable tail ski disposed in tandem with the main ski, flexible wingtip skids universally pivotable to hold the airplane on a substantially even keel when taxiing on ice, snow or other slippery surfaces.

2. In an airplane adapted to land in and take off from water, ice, snow and other slippery surfaces, said airplane being provided with wing tip floats, said floats being cigar shaped and having their axes substantially parallel with the fore-and-aft axis of the airplane, a flexible skid pivotally secured in the forward end of each float, the free end of said skid being extendable downwardly from said float and retractable within the streamlined configuration of said float.

3. In combination with an airplane adapted to move rapidly over water and solid surfaces and having a fuselage, a well in the bottom of said fuselage, landing gear for take-off and landing of said airplane on both water and hard surfaces, said landing gear being shaped for housing in said well in retracted position in a manner to preserve the streamlining of said fuselage, means for supporting and extending said landing gear to vertical support position beneath said fuselage and retracting the same within said well, said well being shaped so that substantially all the surface area thereof is at a positive angle of attack with respect to the water when the landing gear is extended therefrom.

4. In combination with a powered hull adapted to move rapidly over water, a hydrofoil having an aspect ratio substantially less than 1.0 mounted for vertical retraction within and rigid support from below said hull, a well in the lower portion of said hull adapted to receive said hydrofoil in the retracted position in a manner to preserve the streamlining of said hull, said well being shaped so that substantially all of the surface area thereof is at a positive angle of attack with respect to the water when the hydrofoil is extended therefrom.

5. In combination with a powered hull adapted to move rapidly over water, a hydrofoil having an aspect ratio substantially less than 1.0 mounted for vertical retraction within and rigid support from below said hull, a well in the lower portion of said hull adapted to receive said hydrofoil in the retracted position in a manner to preserve the streamlining of said hull, said well being shaped so that substantially all of the surface area thereof is at a positive angle of attack with respect to the water when the hydrofoil is in extended position from said hull, said hydrofoil having a high bow rise and an axis parallel to the fore-and-aft axis of the well.

6. In combination with a powered hull adapted to move rapidly over water, a hydrofoil mounted for vertical retraction within and rigid support from below said hull, a well in the lower portion of said hull adapted to receive said hydrofoil in the retracted position in a manner to preserve the streamlining of said hull, said well being shaped so that substantially all of the surface area thereof is at a positive angle of attack with respect to the water when the hydrofoil is extended therefrom, said hydrofoil having an aspect ratio substantially less than 1.0, a high bow rise, an upper surface curved convexly upwardly from the bow to a point forward of the mid-section and then gradually downward to the stern and, in cross-section, having the shape of a V with a rounded apex, the arms of which symmetrically concavely extend outwardly from the apex to define the lower surface.

7. In combination with an airplane adapted to move rapidly over water and having a fuselage, a hydrofoil, a well in the bottom of said fuselage shaped to substantially house said hydrofoil, means for vertically extending and supporting said hydrofoil beneath said fuselage and retracting the same within said well, said hydrofoil having an aspect ratio substantially less than 1.0, said hydrofoil being pivotally mounted to said vertical support means in a pivoted axis transverse to the axis of said fuselage, means for adjustably varying the angle of support of said hydrofoil to said vertical support means to a desired positive fixed angle of attack, said means for adjusting said angle of attack being releasable for free pivotal movement whereby the hydrofoil is adjustably operative at fixed angle of attack position as a water ski for hydroplaning or as a landing ski upon ice, the undersurface of said well being shaped to present overall a positive angle of attack with respect to the water whereby said airplane is operative for take-off and landing from both water and ice and snow as a solid surface and said well cooperates in the extended position of said hydrofoil for optimum lift in water and to house said hydrofoil in retracted position in flight.

8. In combination with an airplane having a fuselage, a well in the lower surface thereof shaped to substantially house a hydrofoil, a retractable element adapted to support in extended vertical position and retract within said fuselage a hydrofoil fastened to the lower end thereof, said hydrofoil having an aspect ratio less than 1.0 and constructed to serve both as a planing body as well as to provide sufficient lift to support the fuselage above the level of any water in which the airplane may be landed at normal landing and take-off speeds, said well being adapted to substantially house the hydrofoil in retracted position in said fuselage to substantially preserve the streamlining thereof, said well having a surface so shaped that in extended hydrofoil position substantially all of the area thereof is at a positive angle of attack with respect to the water through which the plane is moved and means for retracting said hydrofoil within said well.

References Cited in the file of this patent

UNITED STATES PATENTS

| | | |
|---|---|---|
| 1,203,550 | Curtiss | Oct. 31, 1916 |
| 1,373,408 | Burgess | Apr. 5, 1921 |
| 1,613,842 | Mummert | Jan. 11, 1927 |
| 1,817,901 | Procofieff-Servesky | Aug. 4, 1931 |
| 1,835,618 | Waller | Dec. 8, 1931 |
| 2,073,864 | Brush | Mar. 16, 1937 |
| 2,131,528 | Soyer | Sept. 27, 1938 |
| 2,170,958 | Andrews | Aug. 29, 1939 |
| 2,302,343 | Noorduyn | Nov. 17, 1942 |

FOREIGN PATENTS

| | | |
|---|---|---|
| 354,841 | Germany | June 16, 1922 |
| 587,317 | Great Britain | Apr. 22, 1947 |
| 765,565 | France | Mar. 26, 1934 |